(12) United States Patent
Kennedy, III

(10) Patent No.: US 8,956,488 B2
(45) Date of Patent: Feb. 17, 2015

(54) DIAMINE AS ADHESION ENHANCER

(75) Inventor: Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 350 days.

(21) Appl. No.: 13/408,735

(22) Filed: Feb. 29, 2012

(65) Prior Publication Data

US 2013/0225326 A1 Aug. 29, 2013

(51) Int. Cl.
*A63B 37/12* (2006.01)
*B32B 7/12* (2006.01)
*B32B 27/40* (2006.01)

(52) U.S. Cl.
USPC ..... 156/153; 156/281; 156/308.6; 156/309.3; 156/326; 427/301; 427/302; 428/423.9; 428/424.2; 428/424.8; 473/373; 473/374; 473/377

(58) Field of Classification Search
None
See application file for complete search history.

(56) References Cited

U.S. PATENT DOCUMENTS

| | | | | |
|---|---|---|---|---|
| 4,871,589 A | * | 10/1989 | Kitaoh et al. | 427/322 |
| 5,110,629 A | * | 5/1992 | Gomberg et al. | 427/322 |
| 5,274,054 A | * | 12/1993 | Moser et al. | 525/526 |
| 6,585,607 B2 | * | 7/2003 | Tzivanis et al. | 473/371 |
| 6,652,392 B2 | * | 11/2003 | Higuchi et al. | 473/374 |
| 2004/0033367 A1 | * | 2/2004 | Shimada et al. | 428/422.8 |
| 2012/0021852 A1 | * | 1/2012 | Isogawa | 473/374 |

OTHER PUBLICATIONS

Gelest "Silane Coupling Agents: Connecting Across Bounderies", 2006, p. 29.*
Edited version of introductory lecture given by Owen Brett (Ados Chemical Company) given at the 1990 symposium on adhesive technology organized by the Polymer Group of NZIC.

* cited by examiner

*Primary Examiner* — David Buttner
(74) *Attorney, Agent, or Firm* — Honlgman Miller Schwartz and Cohn LLP; Anna M. Budde; Jonathan P. O'Brien

(57) ABSTRACT

Diamine is used to enhance adhesion between polyurethane and polyolefinic material or ionomeric material.

15 Claims, No Drawings

DIAMINE AS ADHESION ENHANCER

BACKGROUND

The present disclosure relates generally to a diamine adhesion enhancer. In particular, the disclosure is related to cycloaliphatic diamines as adhesion enhancers. More particularly, the disclosure relates to cycloaliphatic diamines as adhesion enhancers between polyolefinic or ionomeric substrates and urethane substrates.

Golf balls are important sporting goods that have changed with changes in technology. For example, balls were first made of wood, and then by stuffing boiled, softened feathers into a leather sack. The sack typically was painted white, and would tighten upon drying. However, because the feather ball tended to absorb moisture and to split, many balls were required to play a round. Also, these feather balls were expensive as compared with wooden balls.

Both feather and wooden balls were in use until the gutta percha ball was made. The gutta percha ball was relatively inexpensive and easily manufactured. Also, the gutta percha ball was fairly durable, as compared with the feather ball, performed well because the surface could easily be roughened to improve flight characteristics, and so became popular. However, the ball exhibited a tendency to break up in flight.

Golf balls comprising other elastic materials then were developed. For example, a golf ball having a rubber core and an elastic thread wound tightly around the core was developed. The winding was covered with gun percha at first, but later with balata. However, balata-covered golf balls often are damaged by players who are less skilled at striking the ball. Thus, tougher covers were developed, including in particular covers comprising a Surlyn® compound or a polyurethane compound.

The interior structure of the golf ball also has advanced, with plastics and polymeric materials having properties and characteristics appropriate for manufacture of high-quality, high-performance, affordable golf balls. In particular, polymeric materials having properties and characteristics appropriate for golf ball manufacture have been developed. Such polymeric materials include polyurethanes and polyolefinic or ionomeric materials, including neutralized acid polymers. Blended materials also are used to manufacture other products.

Often, these various materials are formed into separate layers of a golf ball, with each successive layer essentially surrounding the previous layer. The skilled practitioner recognizes that, typically, the layers must adhere to each other for the golf ball to perform to desired specifications and to be durable. However, many layer combinations that manufacturers seek to make are difficult, if not impossible, to make successfully because interlayer adhesion is poor between dissimilar polymers. In particular, polyolefinic and ionomeric materials do not adhere well to polyurethane materials. However, polyolefinic and ionomeric materials have properties and characteristics that make them especially suitable for interior layers of golf balls, and polyurethane materials can be used to make high-performance, durable covers for golf balls. Thus, the ability to make this bond between an ionomeric material and a polyurethane material can be important.

Therefore, there exists in the art a need for a mechanism by which the bonding between a golf ball layer comprising a polymeric material or ionomeric material and an adjacent layer comprising a polyurethane material can be increased.

SUMMARY

In one aspect, the disclosure provides an adhesion enhancer.

In another aspect, the disclosure provides a diamine adhesion enhancer.

In another aspect, the disclosure provides a diamine adhesion enhancer comprising a cycloaliphatic moiety.

In another aspect, the disclosure provides a diamine adhesion enhancer comprising a cycloaliphatic moiety between an ionomeric or polyolefinic substrate and a polyurethane substrate.

In another aspect, the disclosure provides a diamine adhesion enhancer comprising a cycloaliphatic moiety between an ionomeric or polyolefinic substrate and a polyurethane substrate used to form adjacent layers in a golf ball.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

DETAILED DESCRIPTION

In one aspect, the disclosure provides an adhesion enhancer.

In another aspect, the disclosure provides a diamine adhesion enhancer.

In another aspect, the disclosure provides a diamine adhesion enhancer comprising a cycloaliphatic moiety.

In another aspect, the disclosure provides a diamine adhesion enhancer comprising a cycloaliphatic moiety between an ionomeric or polyolefinic substrate and a polyurethane substrate.

In another aspect, the disclosure provides a diamine adhesion enhancer comprising a cycloaliphatic moiety between an ionomeric or polyolefinic substrate and a polyurethane substrate used to form adjacent layers in a golf ball.

For convenience of description, a diamine adhesion enhancer comprising a cycloaliphatic moiety will be described as a cycloaliphatic diamine throughout the specification and claims.

The skilled practitioner recognizes that ionomeric materials and polyolefinic materials often are used as interior layers of golf balls. Ionomeric materials in golf ball manufacturing include neutralized acid polymers. Typically, the COR of ionomeric materials is high, so ionomeric materials provide good performance properties and characteristics in a durable golf ball. Ionomeric materials also can be used to form an exterior layer that is durable and tough, but may lack some performance properties and characteristics sought by skilled players. The exterior layer typically is called the cover layer or outer cover layer of a multi-layer ball.

Polyolefinic materials also are present in golf balls, typically in interior layers. Polyolefinic materials often are used to make an interior core layer of a golf ball.

The skilled practitioner also recognizes that polyurethane is a material that forms an exterior layer that provides excellent performance properties and characteristics because it provides improved spin and control. Typically, two types of polyurethane are used to form a cover layer. Thermoset polyurethane is durable and provides desired performance properties and characteristics. However, it can be difficult to form a cover layer using thermoset polyurethane. A cover layer is more easily formed using thermoplastic polyurethane. Although this form of polyurethane also provides excellent performance properties and characteristics, it is less durable than thermoset polyurethane. Either type of polyurethane can be used to form a suitable cover layer.

Thus, a typical golf ball construction may include ionomeric or polyolefinic material in interior layers and polyurethane in adjacent layers, including in particular as a cover layer. These adjacent layers should desirably exhibit good mutual adhesion to preclude separation of the layers and failure of the golf ball.

However, ionomeric materials and polyolefinic materials on the one hand and polyurethane materials on the other do not exhibit good mutual adhesion. Ionomeric materials typically are ethylene/(meth)acrylic acid copolymers that have significant portions that are olefinic. Therefore, like olefinic materials, ionomeric materials have a 'low energy' surface, or exhibit low surface energy. Surface energy influences the ability of other materials to adequately wet the surface and create strong bonds. Because polyolefinic and ionomeric materials have low surface energy, like Teflon®, it is difficult to create strong bonds of adhesion with a dissimilar material.

It may be possible to raise the surface energy of the ionomeric or polyolefinic material by treating the surface with primer, flame, plasma, or corona discharge. However, these methods may provide improved results only for a period, typically for a period far shorter than the useful life of a golf ball. Further, these methods require consideration of environmental issues, such as the issue of evaporation of any volatile organic content of the primer.

The inventor has discovered that an adhesion enhancer improves the adhesion between ionomeric or polyolefinic material and polyurethane material. In particular, the inventor has discovered that a diamine, and especially a cycloaliphatic diamine, serves as an adhesion enhancer and significantly improves bond strength. In particular, the diamine serves to increase bond strength between ionomeric or polyolefinic material and polyurethane material.

As used herein, the term "diamine" means a compound that has two terminal amine moieties, and so is at least a diamine, but also may have additional amine moieties not in terminal positions. Such compounds may be identified as triamines, tetramines, and higher order amines, but are considered diamines in this disclosure because they have 2 terminal amine moieties.

The disclosure encompasses adhesion of any ionomeric material or polyolefinic material with any polyurethane material. For convenience and ease of description, the disclosure will be directed to use of a cycloaliphatic diamine to improve or enhance adhesion between adjacent layers of a golf ball. The location within or on the golf ball or the layers does not form an important part of this disclosure. Rather, it is the composition of matter that makes up the adjacent layers that is important. For example, a golf ball may comprise any number of layers, and typically comprises between 2 and 7 layers. Typically, the innermost layers, especially an inner core layer, mantle layers adjacent cover layers, and an inner cover layer, may comprise ionomeric material or polyolefinic material. Similarly, any layer adjacent an ionomeric material or a polyolefinic material may comprise polyurethane material. Typically, in embodiments of the disclosure, cover layers, including inner cover layer and outer cover layer, comprise polyurethane material. For convenience, the disclosure will be directed to, but not limited to, an embodiment wherein the exterior cover layer comprises polyurethane material and the adjacent interior layer comprises ionomeric material.

Polyolefinic materials, ionomeric materials, and polyurethane materials are known to the skilled practitioner.

The inventor has discovered that diamine of formula (I) as follows is an excellent adhesion enhancer adhesion of polyurethane substrate to ionomeric or polyolefinic substrate:

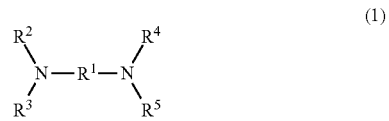

wherein $R^1$ is selected from a saturated or unsaturated aliphatic or cycloaliphatic $C_2$-$C_{18}$ functional group that may include hetero atoms, particularly N and O, and a $C_6$-$C_{18}$ functional group that includes aromatic or aryl groups; and $R^2$, $R^3$, $R^4$, and $R^5$ are the same or different and are independently selected from H and alkyl groups, aryl groups, cycloaliphatic groups, aromatic groups, substituted alkyl groups, substituted aryl groups, substituted cycloaliphatic groups, or heterocyclic groups. Typically, $R^2$, $R^3$, $R^4$, and $R^5$ are H.

A cycloaliphatic compound typically comprises a ring portion and may comprise a chain portion.

Aliphatic compounds are straight chain, branched chain, or non-aromatic ring compounds (also known as cycloaliphatic compounds or alicyclic compounds) that may be saturated (carbon atoms are joined by single bonds) or unsaturated (at least one double or triple bond between carbon atoms is present).

An alkyl group is an alkane functional group having the formula $C_nH_{2n+1}$, where n is between 1 and 10 for the purposes of this disclosure.

An aryl group is a functional group derived from an aromatic ring. In this disclosure, an aryl group is a substituted aromatic group. Thus, for the purposes of this disclosure, aryl groups include phenyl groups, tolyl groups, xylyl groups, and naphthyl groups, for example. Typically, in this disclosure, aryl groups are phenyl groups.

An aromatic group includes a ring of conjugated unsaturated bonds. For example, a benzyl group is an aromatic group for the purposes of this disclosure. A typical example of a diamine having an aromatic-containing $R^1$ group is 4,4'-methylene diamine, A heterocyclic group is a cyclic group, typically saturated, that comprises both carbon and at least one hetero atom, i.e., one atom different from carbon. Typically, hetero atoms are selected from the group consisting of nitrogen, oxygen, sulfur, phosphorus, a halogen, and blends thereof. In particular, a halogen typically is chlorine, bromine, or iodine, $R^1$ may take many forms in this disclosure. For example, $R^1$ may contain aromatic groups or aryl groups, resulting in a diamine having aromatic groups or aryl groups between the terminal amine moieties, such as 4,4'-methylene diamine.

Aliphatic diamines are formed with $R^1$ groups that do not include cyclic moieties. Three examples of such aliphatic diamines suitably used herein include diethylenetriamine (DETA), triethylenetetramine (TETA), and polyoxypropylene diamine.

Similarly, cycloaliphatic diamines of Formula I are made with different $R^1$ groups. For example, $R^1$ may be

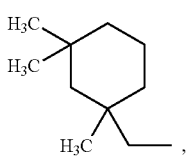

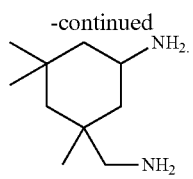

which forms a cycloaliphatic diamine:
Similarly, $R^1$ can be a 4,4-methylenebis(cyclohexyl)radical,

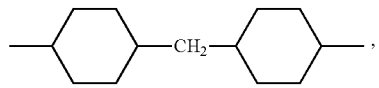

forming the cycloaliphatic diamine 4,4-methylenebis(cyclohexylamine):

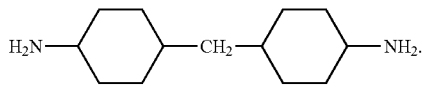

Each of these diamines is available from a variety of sources.

Another suitable cycloaliphatic diamine is Ancamine® 2143, a commercially available cycloaliphatic diamine. This product is a cycloaliphatic diamine adduct available from Air Products and Chemicals, Inc Pennsylvania, USA. This composition comprises a blend of about 35 wt percent benzyl alcohol, about 35 wt percent 4,4'-methylene biscyclohexaneamine, and about 25 wt percent methylenebiscyclohexaneamine reaction products (adducts) with bisphenol diglycidylether homopolymer.

In embodiments of the disclosure, the diamine includes 4,4'-methylene biscyclohexaneamine. In embodiments of the disclosure, derivatives of 4,'4-methylene biscyclohexaneamine are suitably used as the diamine. In other embodiments of the disclosure, the diamine is Ancamine® 2143.

In embodiments of the disclosure, diamine adhesion enhancer, typically cycloaliphatic diamine adhesion enhancer, is applied to the interior layer substrate, typically comprising ionomeric materials, in any way that essentially completely wets the substrate. As the viscosity of some of these cycloaliphatic diamines might be sufficiently high as to make working with cycloaliphatic diamine itself difficult, it is possible to form a solution of cycloaliphatic diamine. Suitable solvents will depend upon the composition of the cycloaliphatic diamine, but, typically, cycloaliphatic diamines are soluble in acetone and other ketones; methyl isobutyl ketone (MIBK), methyl ethyl ketone (MEK), and other dialkyl ketones; toluene, xylene (individually or as a blend of the three (ortho-, meta-, and para-) isomers), and other aromatics; and blends thereof. Suitable solvents not only solvate the cycloaliphatic diamine, but also are not harmful to either substrate, Whereas is may be acceptable for solvent to soften a substrate, which might further enhance adhesion, distortion or dissolution of the substrate should be avoided.

The surface of the substrate to which the cycloaliphatic diamine is to be applied can be prepared in any typical manner. Typically, the surface is at least cleaned, because the surface should be free of loose particles, dust, and debris. However, embodiments of the disclosure also may include abrasion or roughening of the surface of the ionomeric substrate prior to cleaning and application of the cycloaliphatic diamine adhesion enhancer. Such abrasion or roughening may be in the form of scarification or sanding, for example. With the guidance provided herein, the skilled practitioner will be able to properly prepare the surface of the ionomeric substrate.

In embodiments of the disclosure, a solution of cycloaliphatic diamine in solvent or solvents can have a diamine concentration between about 0.05 wt percent and about 90 wt percent, typically between about 0.1 wt percent and about 75 wt percent, and more typically between about 0.1 wt percent and about 50 wt percent. Other concentrations may be used in other embodiments to achieve a selected viscosity or other property or characteristic that the user seeks to obtain. With the guidance provided herein, the skilled practitioner can prepare suitable solutions of cycloaliphatic diamine.

The cycloaliphatic diamine can be applied in any manner known to the skilled practitioner. In embodiments of the disclosure, the substrate can be dipped into or submerged in cycloaliphatic diamine or a solution thereof. In other embodiments, cycloaliphatic diamine or a solution thereof can be sprayed or painted, whether by brush, roller, or another contact method, onto the substrate. In still other embodiments, cycloaliphatic diamine or a solution thereof can be spread on the substrate, such as with a doctor blade, although this type of application method is less common on a surface that is not flat, such as a portion of a golf ball.

The coated substrate then is dried by any suitable method. For example, the wetted substrate can be air dried or dried by application of heat, in a hot atmosphere, or in a moving stream of air or other material. One purpose of drying the wetted substrate is to remove any solvents present with the cycloaliphatic diamine. Drying also affords the opportunity for the cycloaliphatic diamine to bond securely with the substrate to which it has been applied. Thus, the skilled practitioner recognizes that the drying conditions and time may vary significantly between systems involving different substrates, cycloaliphatic diamines, and solvents.

In embodiments of the disclosure, solvent is removed and the wetted substrate dried with adhesion enhancer in place by heating the coated substrate in air at a temperature of between about 70 T and about 200 T for between about 0.5 min and 60 min, more typically between about 1 min and about 30 min. With the guidance provided herein, the skilled practitioner can determine appropriate drying conditions for a system involving a selected substrate, cycloaliphatic diamine, and, if present, solvents.

A polyurethane layer, typically an outer cover layer of a golf ball, then is applied to the dried, coated portions of golf balls, or golf ball inserts. The polyurethane layer may be put in place in any suitable manner. In embodiments of the disclosure, the cover layer comprises thermoplastic polyurethane (TPU) is over-molded onto the golf ball portion. Suitable molding conditions are well known to the skilled practitioner.

Other coatings and treatments typically applied to golf balls, such as paints and printing of, for example, logotypes and other information on a visible surface of the golf ball, may be applied to the external surface of the polyurethane.

Thus, embodiments of the disclosure form an article comprising a substrate comprising polyolefinic material, ionomeric material, and blends thereof, a substrate comprising polyurethane, and a layer of cycloaliphatic diamine adhesion enhancer therebetween to improve mutual adhesion of the substrates.

EXAMPLES

Golf ball inserts, i.e., interior portions of golf balls, were prepared with an ionomeric material as the outer layer. The surface of the ionomer was abraded with sandpaper and then cleaned.

On one-half of the inserts, a TPU cover was molded without additional treatment to provide comparative examples.

A 5 percent solution of Ancamine® 2143 in a blended solvent was made. The blended solvent was 75 percent MIBK and 25 percent toluene. The remaining one-half of the golf ball inserts were immersed in the solution for 10 minutes. The immersed golf ball inserts then were removed from the solution and dried at 150 T for 10 minutes. A TPU cover was molded onto the treated golf ball inserts, just as was done for the inserts used to form comparative examples.

All golf balls were aged overnight, and then cut into quarters. The cover was peeled from each of the quartered golf ball pieces.

The TPU cover on the untreated, comparative example golf balls showed little to no adhesion between the TPU cover layer and the ionomer surface. However, the adhesion was significantly improved between the TPU and the ionomer surface treated with cycloaliphatic diamine adhesion enhancer.

While various embodiments of the invention have been described, the description is intended to be exemplary, rather than limiting and it will be apparent to those of ordinary skill in the art that many more embodiments and implementations are possible that are within the scope of the invention. For example, different layers of a golf ball may comprise polyolefinic, ionomeric, or polyurethane materials. Similarly, a viscous adhesion enhancer may be applied to a planar object comprising an ionomeric or polyolefinic surface by spreading the adhesion enhancer with a doctor blade. Accordingly, the invention is not to be restricted except in light of the attached claims and their equivalents. Also, various modifications and changes may be made within the scope of the attached claims.

What is claimed is:

1. A method for improving adhesion between a first golf ball layer comprising a composition selected from the group consisting of polyolefin material, ionomeric material, and blends thereof, and a second golf ball layer comprising polyurethane, the method comprising:
applying to the first golf ball layer a composition consisting of at least one diamine of the following formula:

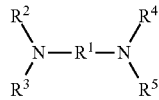

wherein $R^1$ is selected from saturated or unsaturated aliphatic or cycloaliphatic $C_2$-$C_{18}$ functional groups that optionally include hetero atoms and $C_6$-$C_{18}$ functional groups that include aromatic or aryl groups; and $R^2$, $R^3$, $R^4$, and $R^5$ are each independently selected from —H and alkyl groups, aryl groups, cycloaliphatic groups, and aromatic groups, and optionally 4,4-methylenebis(cyclohexylamine) reaction products (adducts) with bisphenol diglycidyl ether homopolymer, and optionally a solvent for the at least one diamine, and
molding the second golf ball layer on the layer consisting of the at least one diamine, wherein any solvent included is removed before molding the second golf ball layer.

2. The method of claim 1, further comprising preparing the surface of the first golf ball layer by one or more of abrasion, roughening, scarification, and cleaning steps before applying the diamine adhesion enhancer thereto.

3. The method of claim 1, wherein the diamine comprises an aliphatic diamine.

4. The method of claim 3, wherein the diamine is polyoxypropylene diamine.

5. The method of claim 1, wherein the diamine comprises cycloaliphatic diamine.

6. The method of claim 5, wherein the cycloaliphatic diamine comprises 4,4-methylenebis(cyclohexylamine).

7. The method of claim 5, wherein the cycloaliphatic diamine comprises the compound of the formula

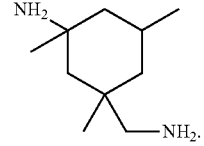

8. A golf ball comprising a first golf ball layer comprising a member selected from the group consisting of polyolefinic material, ionomeric material, and blends thereof, a second golf ball layer comprising polyurethane, and a layer consisting of at least one diamine therebetween to improve mutual adhesion of the first and second layers, the diamine having the following formula:

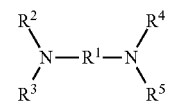

wherein $R^1$ is selected from saturated or unsaturated aliphatic or cycloaliphatic $C_2$-$C_{18}$ functional groups that optionally include hetero atoms, $C_6$-$C_{18}$ functional groups that include aromatic or aryl groups; and $R^2$, $R^3$, $R^4$, and $R^5$ are each independently selected from —H and alkyl groups, aryl groups, cycloaliphatic groups, and aromatic groups, and optionally 4,4-methylenebis(cyclohexylamine) reaction products (adducts) with bisphenol diglycidylether homopolymer.

9. The golf ball of claim 8, wherein the second golf ball layer comprising polyurethane is a cover layer of the golf ball.

10. The golf hall of claim 9, wherein the diamine comprises an aliphatic diamine.

11. The golf ball of claim 10, wherein the diamine is polyoxypropylene diamine.

12. The golf ball of claim 9, wherein the diamine comprises cycloaliphatic diamine.

13. The golf ball of claim 12, wherein the cycloaliphatic diamine comprises 4,4-methylenebis(cyclohexylamine).

14. The golf ball of claim 12, wherein the cycloaliphatic diamine comprises the compound of the formula

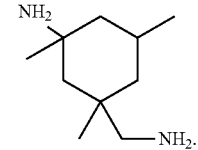

15. A golf ball comprising a first golf ball layer comprising a member selected from the group consisting of polyolefinic material, ionomeric material, and blends thereof, a second golf ball layer comprising polyurethane that is a cover layer of the golf ball, and a layer of diamine therebetween to improve mutual adhesion of the first and second layers, the diamine having the following formula:

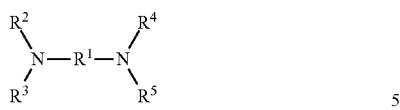

wherein $R^1$ is selected from saturated or unsaturated aliphatic or cycloaliphatic $C_2$-$C_{18}$ groups that optionally include hetero atoms, and $C_6$-$C_{18}$ groups that include aromatic or aryl groups; and $R^2$, $R^3$, $R^4$, and $R^5$ are each independently selected from —H and alkyl groups, aryl groups, cycloaliphatic groups, aromatic groups, substituted alkyl groups, substituted aryl groups, substituted cycloaliphatic groups, or heterocyclic groups, wherein the diamine comprises cycloaliphatic diamine comprising 4,4-methylenebis(cyclohexylamine) and further comprising 4,4-methylenebis(cyclohexylamine) reaction products (adducts) with bisphenol diglycidylether homopolymer.

* * * * *